United States Patent [19]
Bieser et al.

[11] 3,972,244
[45] Aug. 3, 1976

[54] VARIABLE DRIVE BICYCLE TRANSMISSION

[75] Inventors: Albert H. Bieser, Garland; William B. Stuhler, Plano, both of Tex.

[73] Assignee: B.E. Industries, Inc., Garland, Tex.

[22] Filed: May 13, 1975

[21] Appl. No.: 577,023

Related U.S. Application Data

[63] Continuation-in-part of Ser. No. 475,561, June 3, 1974, abandoned.

[52] U.S. Cl. .................. 74/217 B; 74/230.17 B
[51] Int. Cl.² ............... F16H 9/00; F16H 55/54
[58] Field of Search ............ 74/217 B, 230.17 B, 74/230.17 M, 230.17 E

[56] References Cited
UNITED STATES PATENTS

| | | | |
|---|---|---|---|
| 425,390 | 4/1890 | Rice | 74/230.17 B |
| 1,279,547 | 9/1918 | Hueber | 74/230.17 M |
| 2,487,002 | 11/1949 | Thomas, Jr. | 74/230.17 B X |
| 2,950,625 | 8/1960 | Jaulmes | 74/230.17 B |
| 3,837,234 | 9/1974 | Chao | 74/217 B |

FOREIGN PATENTS OR APPLICATIONS

| | | | |
|---|---|---|---|
| 108,560 | 8/1917 | United Kingdom | 74/230.17 B |

*Primary Examiner*—Leonard H. Gerin
*Attorney, Agent, or Firm*—Richards, Harris and Medlock

[57] ABSTRACT

The specification discloses a transmission for varying the mechanical advantage in the power train of a bicycle. The transmission includes a drive sprocket attached to one wheel of the bicycle for driving the wheel and a fixed pitch sheave mounted on the bicycle frame. An endless chain is entrained between the drive sprocket and fixed pitch sheave. A rotatable variable pitch sheave is mounted to move relative to the fixed pitch sheave and is operatively connected to the fixed pitch sheave by a V-belt passing therebetween.

A pedal sprocket is rotatably mounted on the bicycle frame and connected by way of a chain to the variable pitch sheave for rotating the variable pitch sheave. The rotation of the variable pitch sheave by the pedal sprocket causes the movement of the variable pitch sheave relative to the fixed pitch sheave to vary the mechanical advantage therebetween.

17 Claims, 7 Drawing Figures

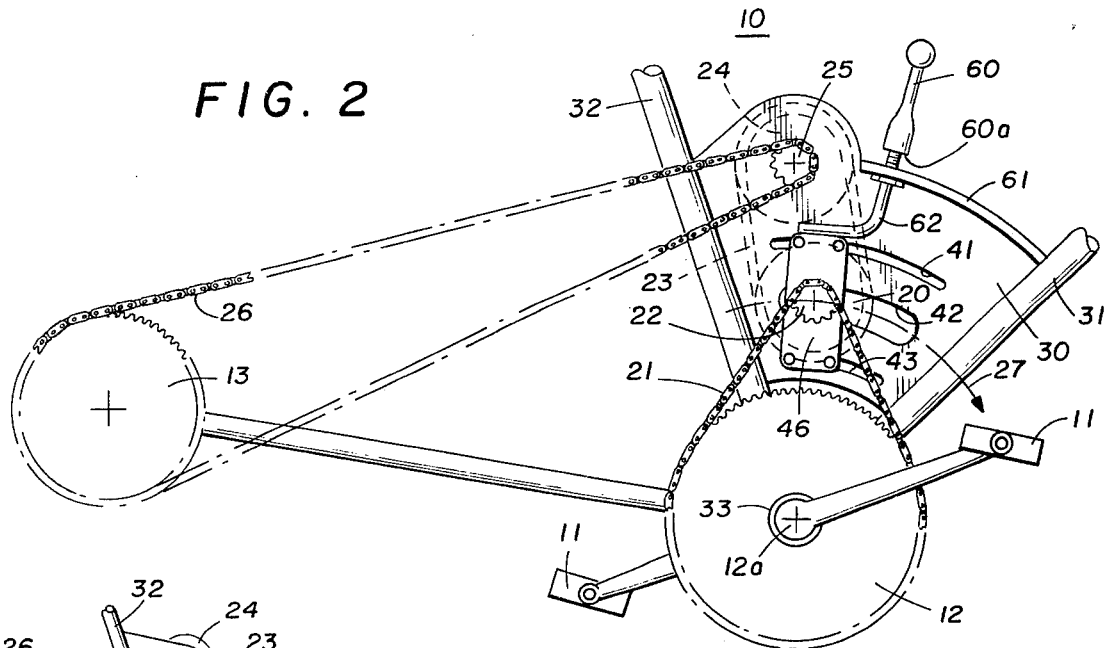
FIG. 2
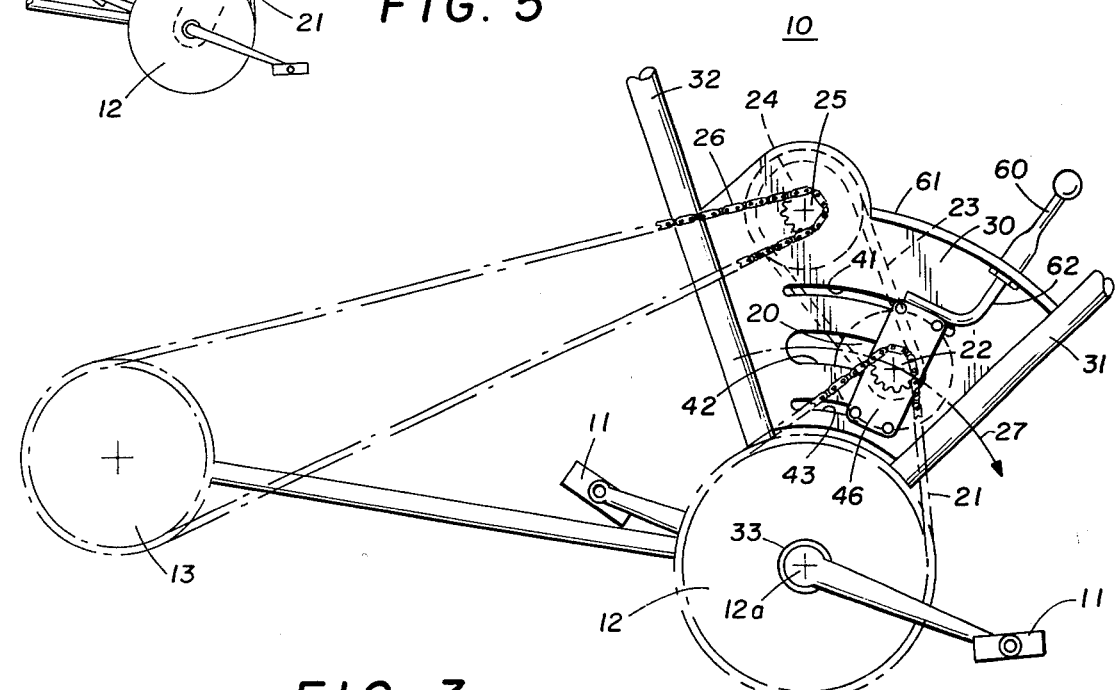
FIG. 5
FIG. 3

VARIABLE DRIVE BICYCLE TRANSMISSION

This application is a continuation-in-part of application Ser. No. 475,561, filed June 3, 1974, now abandoned, entitled "Variable Drive Bicycle Transmission" by the same inventors.

FIELD OF THE INVENTION

This invention relates to a bicycle transmission, and more particularly to an improved automatic continuously variable drive ratio changing transmission.

PRIOR ART

Bicycles provide the most efficient mode of transportation known to man. Many are the variations in construction and operation of bicycle systems. In transmission of power from pedal to drive sprocket, various constructions are known. Conventional manual shifting three speed planetary hub transmissions and conventional Derailleur 5 or 10 speed transmissions are widely used. It is therefore desirable to provide an improved automatic shifting as well as an infinitely variable power ratio transmission. Such an improved transmission would be attractive to bicycle users desiring more convenience, less maintenance and those not able to develop the proper skills in gear shifting techniques necessary for operating the complicated 3, 5 and 10 speed transmission systems. Advantageous to those engaged in a controlled exercise program would be an automatically limiting physical requirement regardless of terrain over which the rider travels.

SUMMARY OF THE INVENTION

In accordance with the present invention, there is provided an improved bicycle transmission which automatically varies the mechanical advantage between pedal sprocket and hub sprocket wherein a first drive stage includes an endless chain entrained between a pedal sprocket and a driven sprocket commonly shafted with and driving a spring loaded variable pitch sheave. The sheave and driven sprocket are mounted to allow limited rotational movement relative to the pedal sprocket. A second drive stage includes an endless V-belt from the variable pitch sheave to a sheave mounted in fixed relation to the pedal sprocket. A third drive stage includes a fixed sprocket commonly shafted with and driven by the fixed sheave.

A chain extends from the fixed sprocket to a wheel hub sprocket. The pitch of the variable sheave is automatically adjusted in relation to the force applied to the pedals so that it automatically accommodates variations in loads. A tangential force vector is effective to increase the V-belt tension in a manner designed to expand the variable pitch sheave as a function of torque.

DESCRIPTION OF THE DRAWINGS

The improved features believed characteristic of the invention are set forth in the appended claims. The invention itself, however, as well as the objects and advantages thereof, will best be understood by reference to the following detailed description of an illustrative embodiment taken in conjunction with the accompanying drawings, in which:

FIG. 2 illustrates the invention in the low torque transmission orientation;

FIG. 3 illustrates the system in the high torque transmission orientation;

FIG. 5 illustrates a modified sheave mount;

DESCRIPTION OF THE PREFERRED EMBODIMENTS

Figure 1:
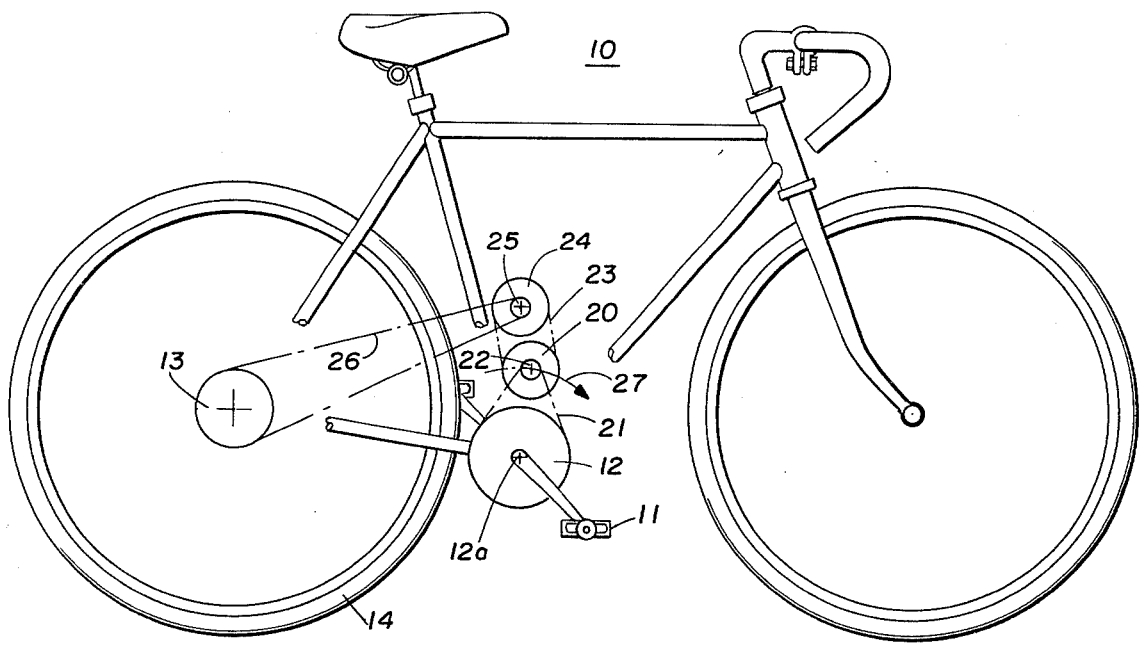
FIG. 1 is a diagrammatic representation of a bicycle embodying the present invention.

Referring now to the drawings and more particularly FIG. 1, a bicycle 10 is provided with a conventional frame structure in which drive forces are applied by way of pedals 11 through a pedal sprocket 12. The forces thus generated are to be applied by way of a suitable transmission system to a hub sprocket 13 which is affixed to the axis of the rear wheel 14. Traditionally, a chain drive has coupled the pedal sprocket 12 to the hub sprocket 13. In the multi speed transmission systems, provision is made for varying the torque ratio in the drive between the pedal sprocket 12 and the hub sprocket 13. In accordance with the present invention, an improved continuously variable automatically operative variable torque transmission is provided. This transmission includes a spring loaded variable pitch sheave 20 which is driven by the pedal sprocket 12 by way of an endless chain 21 and a first sheave sprocket 22. A V-belt 23 coupled sheave 20 to a fixed sheave 24. A second sheave sprocket 25 is connected by way of an endless chain 26 to the hub sprocket 13. The variable pitch sheave 20 is mounted on the bicycle frame so that it can physically rotate along an arc centered about the axis 12a of the pedal sprocket 12. More particularly, it may move along an arc represented by arrow 27.

Automatic torque conversion is accomplished using a conventional spring loaded variable pitch sheave 20 and a V-belt drive in the arrangement shown in FIG. 1 such that the tangential force vectors are effective to increase the V-belt tension in a manner which expands the variable pitch sheave as a function of torque. In other words, as the bicycle rider applies more force to the pedals, the transmission shifts down automatically to reduce his effort. As torque requirements are reduced as in maintaining constant speed on level ground, the spring in the variable pitch pulley forces the ratio back to a high ratio without manual intervention of any kind. Thus, the invention provides for automatic change in the ratio rather than manual shifting which is a convenience to the operator. It incorporates a smoothness of operation in an infinitely variable system rather than providing a sudden step in the torque ratio. Less parts are required and thus lower maintenance or need for adjustments are involved as compared to the 5 and 10 speed transmissions above mentioned. Automatically limited is the strain and effort that may be involved in a given operator driving his bicycle.

Figure 4:
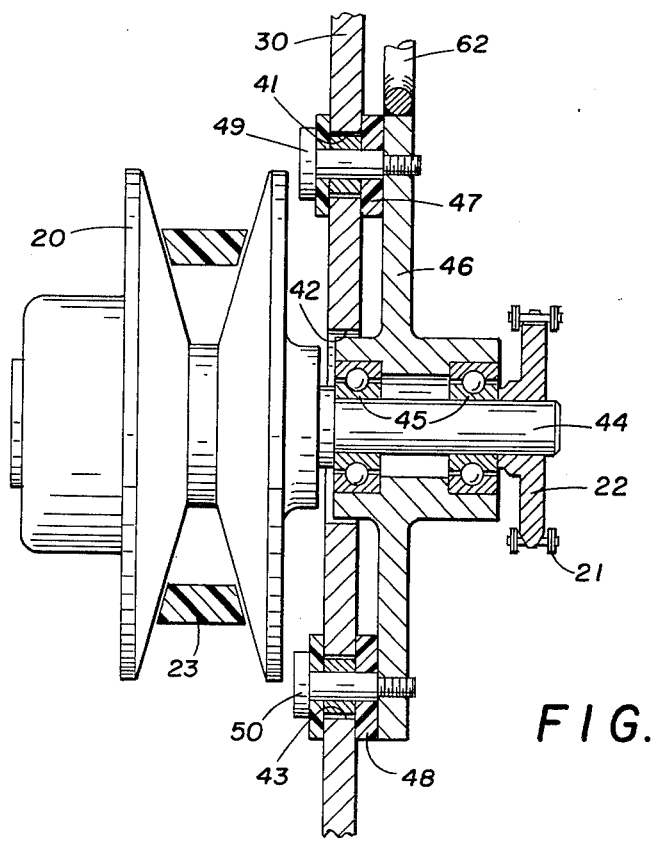
FIG. 4 is a detailed view of the mounting of the variable pitch sheave.

Referring now to FIGS. 2, 3 and 4, the parts have been given the same reference characters as in FIG. 1. In FIG. 2, the transmission is shown in the low ratio orientation. The sheaves 20 and 24 are mounted on a plate 30 which is integral with the frame members 31 and 32. The pedal shaft bearing structure 33 is provided in the conventional manner at the intersection of elements 31 and 32 whereas the plate 30 extends between the frame members 31 and 32. The variable sheave 20 is mounted as to be movable in plate 30 along a path indicated by arrow 27. The plate 30 has three arcuate slots 41, 42 and 43.

A support structure including a bearing for sheave 20 and sprocket 22 has slide bearings which register in slots 41 and 43 whereas the shaft 44 to which sheave 20 and sprocket 22 are secured passes through slot 42. The sheave 20 is on the side of plate 30 opposite sprocket 22 and similarly, belt 23 and sheave 24 are on the side of plate 30 opposite sprockets 22 and 25. As increased force is applied to pedals 11, the resultant torque supplied to sheave 20 causes it to move in the direction of arrow 27 to assume a high ratio position as illustrated in FIG. 3. That is, the sheave 20 moves forward along slots 41–43 so that the belt 23 assumes a relatively small pitch circle around sheave 20.

The mounting of sheave 20 has been further illustrated in FIG. 4. Here it will be noted that the sprocket 22 and sheave 20 are keyed to a shaft 44. The shaft 44 is mounted on bearings 45 which are housed in a plate 46. Plate 46 has four slide bearings, two of which are seen in FIG. 4. More particularly, a top bearing 47 is slidably mounted in slot 41 and a bottom bearing 48 is slidably mounted in slot 43. A pin 49 passes through bearing 47 and is threadedly secured in the upper end of plate 46. A pin 50 passes through bearing 48 and threadedly is secured to the lower end of plate 46. Thus, the plate 46 carrying sheave 22 is mounted with the shaft 44 passing through the large slot 42.

It will be appreciated that variations may be adopted in the specific way in which the variable pitch sheave 20 is mounted for movement in response to varying torque applied through the pedals. The specific structure illustrated in FIGS. 2–4 is exemplary and is not to be taken as limiting.

While details of the mounting of the fixed sheave 24 and the associated sprocket 25 have not been illustrated in detail, this mounting will be a conventional bearing mounted in plate 30 to accommodate the shaft to which sprocket 25 and sheave 24 are keyed.

While the system thus far described operates automatically, there is provided a manually actuated gear shift means. A gear ratio control lever 60 passes through a slot in an arcuate flange 61 extending along the top boundary of plate 30. The flange 61 has its center of curvature at the axis of the pedal sprocket 12. Lever 60 has a threaded lower end which engages the upper end of a curved rod 62. Rod 62 is secured to plate 46 and extends upward through the flange 61. As the drive ratio changes, the lever 60 moves with the plate 46. If the operator desires to have the drive system locked in a fixed position, lever 60 is merely threaded down onto rod 62 so that the lower end 60a engages the upper surface of the flange 61. While lever 60 has been shown merely extending above flange 61 a convenient distance, it may be further extended to a position more readily accessible to an operator, either directly or by a cable system.

Furthermore, it will be recognized that while a single spring loaded sheave 20 has been shown operating in conjunction with a fixed sheave 24, a pair of spring loaded sheaves may be employed. More particularly, a spring loaded sheave may be mounted in place of the fixed sheave 24 with suitable and known means to synchronize the pitch changes therein; one changing equally and opposite to the other. Such control causes the sheave 20 to open while the spring loaded sheave at location 24 closes and vice versa.

While the system has been illustrated in FIGS. 2 and 3 as involving a plate 30 welded to and thus integral with the frame members 31 and 32, it is to be understood that the invention may be embodied in kit form. In such event, a plate such as plate 30 would be somewhat extended at the boundaries which are now shown welded to the frame members 31 and 32. Rather than being welded, plate 30 may then be affixed to the frame by U-clamps or other fastening means so that there can be conversion from conventional drives to the present system by using an adapter kit.

While the system of FIGS. 1–4 has been illustrated as a preferred embodiment of the invention, it will be appreciated that further modifications may be made. For example, as illustrated in FIG. 5, the sheave 24 may be mounted on a plate secured to base member 32. The variable pitch sheave 20 may be mounted on a yoke 70 which is pivoted about the axis of the pedal sprocket 12 and which may then cause the spring loaded sheave 20 to travel along an arc the center of which is at the axis of the pedal sprocket 12. This and other modifications may now become apparent.

Figure 6:
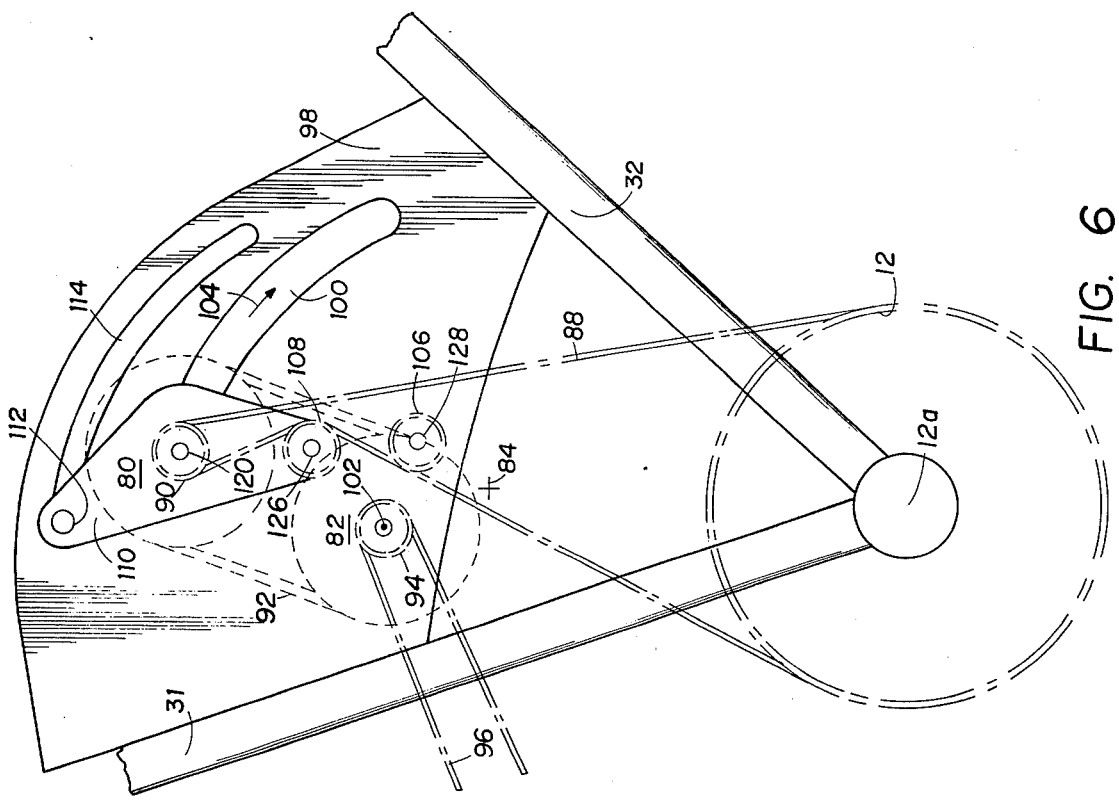
FIG. 6 illustrates an alternate embodiment of the transmission unit of the present invention in the low torque transmission orientation.
Figure 7:
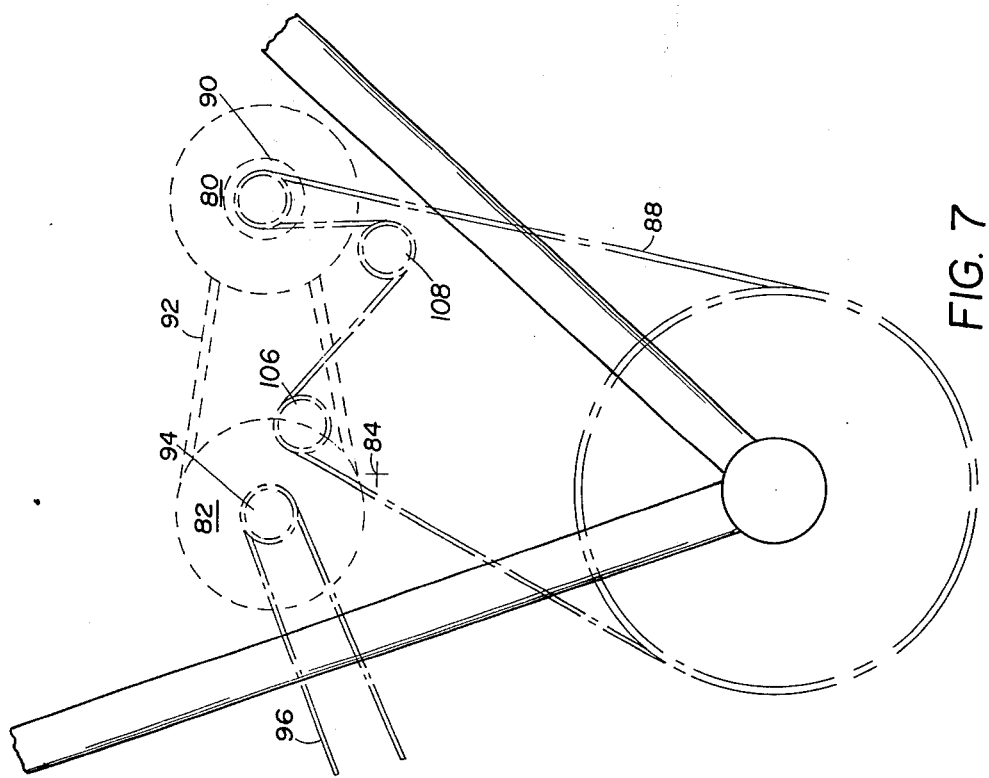
FIG. 7 illustrates the system of FIG. 6 in the high torque transmission orientation.

FIGS. 6 and 7 illustrate another embodiment of the present invention wherein a variable pitch sheave 80 is positioned above fixed sheave 82 and pivots about axis 84 located considerably above pedal axis 12a. Spring loaded variable pitch sheave 80 is driven by pedal sprocket 12 by way of an endless chain 88 and a first sheave sprocket 90 integrally attached to variable pitch sheave 80. A V-belt 92 couples sheave 80 to fixed sheave 82. A second sheave sprocket 94, integrally attached to fixed sheave 82, is connected by way of an endless chain 96 to hub sprocket 13 (FIG. 1).

Sheaves 80 and 82 are mounted on a plate 98 which is integral with frame members 31 and 32. Variable sheave 80 is mounted for movement in plate 98 along a path defined by arcuate slot 100 while sheave 82 is fixedly mounted for rotation about axis 102 of a shaft passing through plate 98 and onto which both sheave 82 and sprocket 94 are fixed. Sheave 80 is positioned on the side of plate 98 opposite sprocket 90, and similarly, belt 92 and sheave 82 are on the side of plate 98 opposite sprockets 90 and 94. As in the earlier embodiments, as increased force is applied to pedals 11, the resultant torque supplied to sheave 80 causes it to move in the direction of arrow 104 to assume a high ratio position as illustrated in FIG. 7. That is, sheave 80 moves forward along slot 100 so that belt 92 assumes a relatively small pitch circle around sheave 80.

In contrast to the embodiments illustrated in FIGS. 1–5, this arrangement increases the mechanical advantage, that is the ratio of belt tension to input torque, as the transmission shifts toward the low gear position illustrated in FIG. 7. Compared with the configuration of FIG. 1 the configuration of FIGS. 6 and 7 provides approximately two times as much belt tension when the transmission is in the high gear position shown in FIG. 6 and five times as much belt tension when the transmission shifts to the low gear position of FIG. 7 for a given amount of torque input at the pedal axis. Because belt demand is greatest at the "low" position, this configuration is more apt to eliminate slippage and extend the total speed range of the transmission configuration. Simultaneously, it also increases stiffness at the "high" end and greatly diminishes the presence of any "sponginess" at this point, which is due to the non-linearity evident in the force vector curve.

In this configuration, because axis 84 about which variable pitch sheave 80 translates is not coincident with pedal axis 12a as in embodiments illustrated in FIGS. 1–5, the center distance from the variable pitch sheave 80 to the pedal axis no longer remains constant with the translation of variable pitch sheave 80 along slot 100. This requires that a take-up system be provided for the non-driving portion of chain 88. Referring to FIGS. 6 and 7, a system for taking up the slack in chain 88 as the variable pitch sheave 80 translates along arcuate slot 100 is provided which includes a fixed idler sprocket 106 and a variably positioned idler sprocket 108. The fixed idler sprocket 106 is mounted on plate 98 and is rotatably supported. The variable idler sprocket 108 is attached to and positionably controlled by a yoke 110 which also supports variable pitch sheave 80 and sprocket 90. As tension in chain 88 increases due to increased pedal torque, yoke 110 supporting variable idler sprocket 108 and variable pitch sheave 80 is moved in an arc indicated by arrow 104 to increase the distance from variable pitch sheave 80 to fixed sheave 82, thereby decreasing the pitch diameter of variable pitch sheave 80 and the overall transmission ratio. Yoke 110 supporting variable pitch sheave 80 and variable idler sprocket 108 is guided along plate 98 by the movement of cam follower 112 attached to yoke 110 and moving within arcuate slot 114 in plate 98. Cam follower 112 is so located on yoke 110 and arcuate slot 114 is so contoured as to vary the angular orientation of variable idler sprocket 108 to keep the total course for drive chain 88 of constant length throughout the entire shift range. This assures that drive chain 88 has minimum loss and remains positive in either direction of rotation with a constant slack. Therefore, when properly adjusted, chain 88 cannot move off of its course around drive sprocket 12, fixed idler sprocket 106, variable idler sprocket 108 and variable pitch sheave 90. It will be noted that the take-up system provided in the present invention is accomplished without the use of spring loaded idlers for chain 88. This is particularly advantageous as spring loaded idlers result in undesirable power loss and introduce the possibility of the chain coming off when back-pedaling.

The mounting of variable pitch sheave 80, variable idler sprocket 108, fixed idler sprocket 106 and cam follower 112 in plate 98 may be of the same general nature as in FIG. 4 but with the shaft for sprocket 90 and sheave 80 being fixed for rotation only in yoke 110 and translatable along slot 100. Sheave 80 and sprocket 90 may be keyed to a shaft 120 which is mounted on bearings (not shown) in yoke 110. Yoke 110 may have a slide bearing slidably mounted in slot 114 and a main slide bearing mounted in slot 100. Thus, the movement of yoke 110 relative to plate 98 is facilitated by the translation of slide bearings moving in slots 114 and 100, respectively.

Sprocket 108 is rotatably suspended from shaft 126 which is fixedly attached to yoke 110. Similarly, sprocket 106 is rotatably mounted on shaft 128 also fixedly attached to plate 98. The mountings are not illustrated in detail.

Variations may be adopted in the specific way in which variable pitch sheave 80 is mounted for movement along the path defined by arcuate slot 100 in response to varying torque applied through pedals 11. Therefore, the specific structure illustrated in FIGS. 6 and 7 is by way of illustration only and is not to be taken as limiting, and the invention herein is intended to cover variations thereof.

While the movement of variable pitch sheave 80 along arcuate slot 100 is automatic in response to the torque applied to sprocket 90 by pedal sprocket 12, a system for manually translating the variable pitch sheave 80 relative to fixed sheave 82 may be provided.

Having described the invention in connection with certain specific embodiments thereof, it is to be understood that further modifications may now suggest themselves to those skilled in the art and it is intended to cover such modifications as fall within the scope of the appended claims.

What is claimed is:

1. An apparatus for varying the mechanical advantage in the power train of a bicycle comprising:
   drive means attached to one wheel of the bicycle for driving said wheel,
   a fixed pitch sheave mounted on the bicycle frame and operatively connected to said drive means,
   a rotatable variable pitch sheave mounted to move relative to said fixed pitch sheave,
   means for operatively connecting said fixed pitch sheave and said variable pitch sheave in a driving and driven relation, respectively, and
   pedal means rotatably mounted on the bicycle frame and operatively connected rotationally to drive said variable pitch sheave and for moving said variable pitch sheave relative to said fixed pitch sheave for varying the mechanical advantage therebetween.

2. The apparatus of claim 1 wherein the connection between said pedal means and said variable pitch sheave comprises:
   a first sprocket integral with said pedal means,
   a second sprocket integral with said variable pitch sheave, and
   a first endless chain entrained between said first and second sprockets.

3. The apparatus of claim 2 wherein said drive means comprises:
   a third sprocket connected to one wheel of the bicycle for driving said wheel.

4. The apparatus of claim 3 wherein the connection between said fixed pitch sheave and said drive means comprises:
   a fourth sprocket integral with said fixed pitch sheave, and
   a second endless chain entrained between said third and fourth sprocket.

5. The apparatus of claim 4 wherein structure is provided defining an arc having as its center the axis of rotation of said pedal means along which said rotatable variable pitch sheave may move.

6. The apparatus of claim 4 wherein said structure is positioned on the side of said fixed pitch sheave away from said pedal means to limit the movement of said rotatable variable pitch sheave along an arc having its center intermediate of the axis of rotation of said pedal means and the center of said fixed pitch sheave.

7. The apparatus of claim 6 and further comprising: chain tightening means for altering the course of said first chain for maintaining tension in said chain.

8. The apparatus of claim 7 wherein said chain tightening means comprises:
   a fixed idler sprocket attached to said frame, a variable idler sprocket movable in response to the movement of said variable pitch sheave, said fixed and said variable idler sprockets positioned to alter the course of said first chain with the movement of said variable pitch sheave and said idler sprocket to maintain tension on said first chain.

9. Transmission means for varying the mechanical advantage between a pedal sprocket and a hub sprocket mounted on a bicycle frame which comprises:

a fixed pitch sheave mounted on the bicycle frame, means responsive to the rotation of said fixed pitch sheave for rotating said hub sprocket, a rotatable variable pitch sheave mounted to move relative to said fixed pitch sheave, means responsive to the rotation of said variable pitch sheave for rotating said fixed pitch sheave, and means responsive to the rotation of the pedal sprocket for rotating said variable pitch sheave and moving said variable pitch sheave relative to said fixed pitch sheave to change the mechanical advantage between the pedal sprocket and hub sprocket.

10. The bicycle drive of claim 9 wherein the structure is provided to limit movement of said rotatable variable pitch sheave along an arc having as its center the axis of rotation of said pedal sprocket.

11. The bicycle drive of claim 9 and further comprising:

lever means for manually moving said variable pitch sheave along said arc, and lock means for securing said lever to said frame for locking said variable pitch sheave in any selected position along said arc.

12. The bicycle drive of claim 9 wherein structure is provided to limit the movement of said rotatable variable pitch sheave along an arc having its center intermediate of the axes of the pedal sprocket and fixed pitch sheave.

13. The bicycle drive of claim 12 wherein said means responsive to the rotation of the pedal sprocket for rotating said variable pitch sheave is an endless chain entrained about said pedal sprocket and a sprocket connected in driving relation to said variable pitch sheave.

14. The bicycle drive of claim 13 and further comprising chain tightening means for altering the course of said chain for maintaining tension therein as said variable pitch sheave moves in response to the rotation of the pedal sprocket.

15. A bicycle drive for automatically varying torque transmission from a pedal sprocket to a hub sprocket which comprises:

a first drive stage including a chain from the hub sprocket to and including a sprocket integral with a fixed pitch sheave mounted in fixed relation to the pedal sprocket, a second drive stage including a V-belt from said fixed pitch sheave to and including a spring loaded variable pitch sheave mounted to travel in an arc relative to the pedal sprocket and said fixed pitch sheave, and a third drive stage including a sprocket integral with said variable pitch sheave and a chain extending therefrom to the pedal sprocket, the rotation of said third drive stage characterized by the movement of said variable pitch sheave along its arc of travel relative to said fixed pitch sheave whereby the pitch of said variable pitch sheave is changed as a result of the torque applied thereto by the pedal sprocket.

16. The bicycle drive of claim 15 wherein structure is provided to limit the travel of said variable pitch sheave to an arc having as its center the axis of rotation of said pedal sprocket.

17. The bicycle drive of claim 15 wherein structure is provided to limit the travel of said variable pitch sheave to an arc positioned on the side of said fixed pitch sheave away from said pedal sprocket.

* * * * *